Patented Dec. 6, 1949

2,490,706

UNITED STATES PATENT OFFICE 2,490,706

MANUFACTURE OF ZINC NICOTINYL FLUOSILICATE

Peter L. de Benneville, New York, N. Y., assignor to Allied Chemical & Dye Corporation, a corporation of New York No Drawing. Application October 2, 1944, Serial No. 556,888

2 Claims. (Cl. 260—270)

This invention is directed to a process for producing zinc nicotinyl fluosilicate.

In the copending application in which I am one of the joint inventors, filed September 16, 1944, Serial No. 554,536, we have disclosed a process of producing metal nicotinyl fluosilicates by reacting the desired metal fluosilicate and nicotine in the presence of a polar solvent, chemically inert to the metal fluosilicate and nicotine, and in which the reactants are soluble under reaction conditions at a temperature below that at which no substantial decomposition of the metal fluosilicate takes place, followed by removal of the solvent, for example by evaporation to effect isolation of the desired reaction product. It is an object of this invention to produce zinc nicotinyl fluosilicate having a mol ratio of zinc fluosilicate:nicotine of 1:1 in which process the reaction product precipitates from the reaction mixture, thereby greatly facilitating its recovery and eliminating the necessity for evaporating large amounts of solvent to obtain the desired reaction product.

I have discovered that by adding nicotine to a solution of zinc fluosilicate in the presence of a monohydric aliphatic alcohol miscible with water, zinc nicotinyl fluosilicate having 1 mol of zinc fluosilicate per mol of nicotine precipitates from the reaction mixture.

In carrying out the reaction, nicotine, for example commercial nicotine which may contain 5 to 10% water and zinc fluosilicate ($ZnSiF_6.6H_2O$), may be used. Preferably the solvent for the reaction medium is an aliphatic monohydric alcohol miscible with water and having less than 5 carbon atoms. Of suitable alcohols such as methyl, ethyl, isopropyl, n-propyl, and tertiary butyl, methanol is preferred; aqueous methanol, i. e., methanol containing from 5 to 10% water, is considered to be the most suitable solvent medium for the reaction.

The optimum conditions for carrying out the reaction involve the addition of the nicotine to methanol containing 5 to 10% water in which the zinc fluosilicate is dissolved, the reaction being carried out at room temperature (e. g. 25° C.). If desired, however, the reaction temperature may be maintained within the range of zero to 100° C., pressure being such as to prevent any substantial evaporation of the solvent employed.

Under these conditions, most of the zinc nicotinyl fluosilicate precipitates. As the ratio of water to methanol or other alcohol increases, an increasingly greater quantity of the zinc nicotinyl fluosilicate remains in solution. This dissolved portion of the reaction product can be isolated in the solid state by evaporation of the solvent.

It is important to add the nicotine to the solution of fluosilicate because by so doing the precipitation along with the desired reaction product of undesirable mixtures of basic salts and zinc hydroxide, which produces gelatinous precipitates, is minimized.

The proportions in which the zinc fluosilicate and nicotine are reacted are not of controlling importance, i. e., any desired proportion may be used. If a substantially pure zinc nicotinyl fluosilicate having one mol of nicotine per mol of zinc fluosilicate is desired, equimolar proportions should be used. The use of an excess of nicotine or zinc fluosilicate over and above the one mol required for chemical combination with each other to produce a product having one mol of zinc fluosilicate per mol of nicotine will result in an excess of reactants remaining in solution and possibly some contamination of the desired reaction product with zinc fluosilicate and uncombined nicotine. The reactants dissolved in the reaction medium as well as that in the mother liquor and the solvent can be recovered, if desired, or used in preparing additional batches of the product.

Nicotine recovery may be effected by removing methanol from the mother liquor by distillation, treating the residual aqueous solution with caustic soda and permitting the resultant mixture to stratify; a lower aqueous layer and an upper nicotine layer are thus formed and may be separated and the nicotine passed to the reactor.

The following example is illustrative of the process of this invention; it will be understood, however, that the invention is not confined thereto:

50 grams of $ZnSiF_6.6H_2O$ were dissolved in a solution containing 50 cc. of water and 500 cc. of methanol. 25 grams of nicotine were then added slowly, while stirring, to the zinc fluosilicate solution over a period of 15 minutes. A crystalline precipitate of zinc nicotinyl fluosilicate was obtained which was filtered, washed with 50 cc. of fresh methanol, and dried at room temperature to a constant weight. 50 grams of $ZnSiF_6.6H_2O$ were then dissolved in 500 cc. of the filtrate and 25 grams of nicotine added, as before, to this solution. The precipitate produced was washed with 50 cc. of methanol, as previously, and the filtrate from the isolation of this precipitate and the methanol wash liquor were combined and 50 grams of zinc fluosilicate ($ZnSiF_6 \cdot 6H_2O$) dissolved therein. 25 grams of nicotine were added as before to this solution. The precipitate thus produced was isolated by filtration. 100 cc. of the resultant filtrate or mother liquor (approximately 500 cc.) were passed to a recovery still for methanol from which approximately 90 cc. of methanol distillate were recovered. In all subsequent runs the solvent for the reaction was prepared by mixing (1) the portion of the filtrate or mother liquor not subjected to distillation with (2) the aqueous methanol recovered by the distillation in the recovery still of the portion of the filtrate thus treated, and (3) fresh methanol to produce 500 cc. of solution. Seven recycles were thus carried out; the product obtained from the original cycle and from each of the recycles analyzed as follows:

| | Weight Product in Grams | Per Cent Zn | Per Cent $SiF_6$ | Per Cent Nicotine |
|---|---|---|---|---|
| Product of original cycle | 60.5 | 18.1 | 31.2 | 39.6 |
| Product of First Recycle | 67.7 | 14.3 | 32.8 | 31.6 |
| Product of Second Recycle | 65.8 | 15.2 | 31.4 | 32.8 |
| Product of Third Recycle | 65.4 | 15.0 | 32.6 | 33.7 |
| Product of Fourth Recycle | 65.7 | 15.7 | 32.6 | 33.5 |
| Product of Fifth Recycle | 65.3 | 15.7 | 32.6 | 33.8 |
| Product of Sixth Recycle | 64.4 | 15.8 | 32.6 | 32.6 |
| Product of Seventh Recycle | 65.0 | 16.4 | 32.6 | 33.0 |

The product is thus a zinc nicotinyl fluosilicate containing one mol of nicotine per mol of zinc fluosilicate and also a small amount of zinc oxide and zinc fluosilicate.

What is claimed is:

1. The process of preparing zinc nicotinyl fluosilicate containing about one mol of nicotine per mol of zinc fluosilicate, which comprises slowly adding nicotine to a solution of zinc fluosilicate in methanol containing 5 to 10% by weight of water at about room temperature, while stirring, to precipitate the said nicotinyl fluosilicate, and separating the precipitate from the solution.

2. The process of preparing zinc nicotinyl fluosilicate containing about 1 mol of nicotine per mol of zinc fluosilicate which comprises adding nicotine to a solution of zinc fluosilicate in methanol containing 5 to 10% by weight of water at a temperature of from zero to 100° C., thereby precipitating the said nicotinyl fluosilicate.

PETER L. DE BENNEVILLE.

REFERENCES CITED

The following references are of record in the file of this patent:

UNITED STATES PATENTS

| Number | Name | Date |
|---|---|---|
| 1,915,334 | Salzberg | June 27, 1933 |
| 2,110,608 | Moore et al. | Mar. 8, 1938 |
| 2,150,601 | Flint | Mar. 14, 1939 |
| 2,356,185 | Smith | Aug. 22, 1944 |
| 2,360,042 | Dearborn | Oct. 10, 1944 |

FOREIGN PATENTS

| Number | Country | Date |
|---|---|---|
| 492,660 | Great Britain | Sept. 20, 1938 |

OTHER REFERENCES

Morton, "Laboratory Technique in Organic Chemistry," pp. 148, 149 (McGraw-Hill, New York, N. Y., 1938).

Hansberry, J. Econ. Entom., vol. 34, pp. 81 and 82 (Feb. 1941).

Hansberry, J. Econ. Entom., vol. 35, pp. 915–918 (1942).